(12) United States Patent
Chandler

(10) Patent No.: US 8,839,743 B2  
(45) Date of Patent: Sep. 23, 2014

(54) APPARATUS AND METHOD FOR FORMING A CART

(71) Applicant: Randal L. Chandler, Lindsay, OK (US)

(72) Inventor: Randal L. Chandler, Lindsay, OK (US)

(*) Notice: Subject to any disclaimer, the term of this patent is extended or adjusted under 35 U.S.C. 154(b) by 0 days.

(21) Appl. No.: 13/939,415

(22) Filed: Jul. 11, 2013

(65) Prior Publication Data

US 2013/0291803 A1  Nov. 7, 2013

Related U.S. Application Data

(62) Division of application No. 12/942,755, filed on Nov. 9, 2010, now abandoned.

(51) Int. Cl.
| | |
|---|---|
| A01K 1/00 | (2006.01) |
| A01K 1/02 | (2006.01) |
| A01K 1/06 | (2006.01) |
| B60P 3/04 | (2006.01) |
| B62B 3/02 | (2006.01) |

(52) U.S. Cl.
CPC ............ *B60P 3/04* (2013.01); *A01K 1/0245* (2013.01); *A01K 1/0236* (2013.01); *A01K 1/0613* (2013.01); *B62B 2202/42* (2013.01); *B62B 2205/104* (2013.01); *B62B 2204/00* (2013.01); *B62B 3/025* (2013.01)
USPC .......................................... 119/519; 119/412

(58) Field of Classification Search
CPC . A01K 1/0245; A01K 1/0236; A01K 1/0035; B60P 3/04
USPC .............. 119/412, 453, 472, 496, 512, 519; 296/204, 205
See application file for complete search history.

(56) References Cited

U.S. PATENT DOCUMENTS

| | | | | |
|---|---|---|---|---|
| 5,353,738 | A * | 10/1994 | Chiu | 119/461 |
| 5,701,843 | A * | 12/1997 | Lazides | 119/496 |
| 5,769,478 | A * | 6/1998 | Vernese | 296/24.31 |
| 6,499,783 | B1* | 12/2002 | Husted | 296/24.31 |
| 6,832,580 | B2* | 12/2004 | Marchioro | 119/452 |
| 8,240,274 | B2* | 8/2012 | Greene et al. | 119/453 |
| 2007/0277745 | A1* | 12/2007 | Clemmons et al. | 119/455 |

* cited by examiner

*Primary Examiner* — Peter M Poon  
*Assistant Examiner* — Danielle Clerkley  
(74) *Attorney, Agent, or Firm* — Dunlap Codding, P.C.

(57) ABSTRACT

A cart for transporting livestock equipment having a first and a second stall dividers and two dollies. The first dolly includes a horizontal member, a pair of wheels, and a pair of outer support members. The second dolly includes a horizontal member, a pair of wheels, and a pair of outer support members. To form a cart, an outer support member of the first dolly is received in one of the vertical members of the first stall divider, and the other outer support member of the first dolly is received in the opening of one of the vertical members of the second stall divider. An outer support member of the second dolly is received in the first stall divider and the outer support member of the second dolly is received in the opening of the second stall divider.

8 Claims, 7 Drawing Sheets

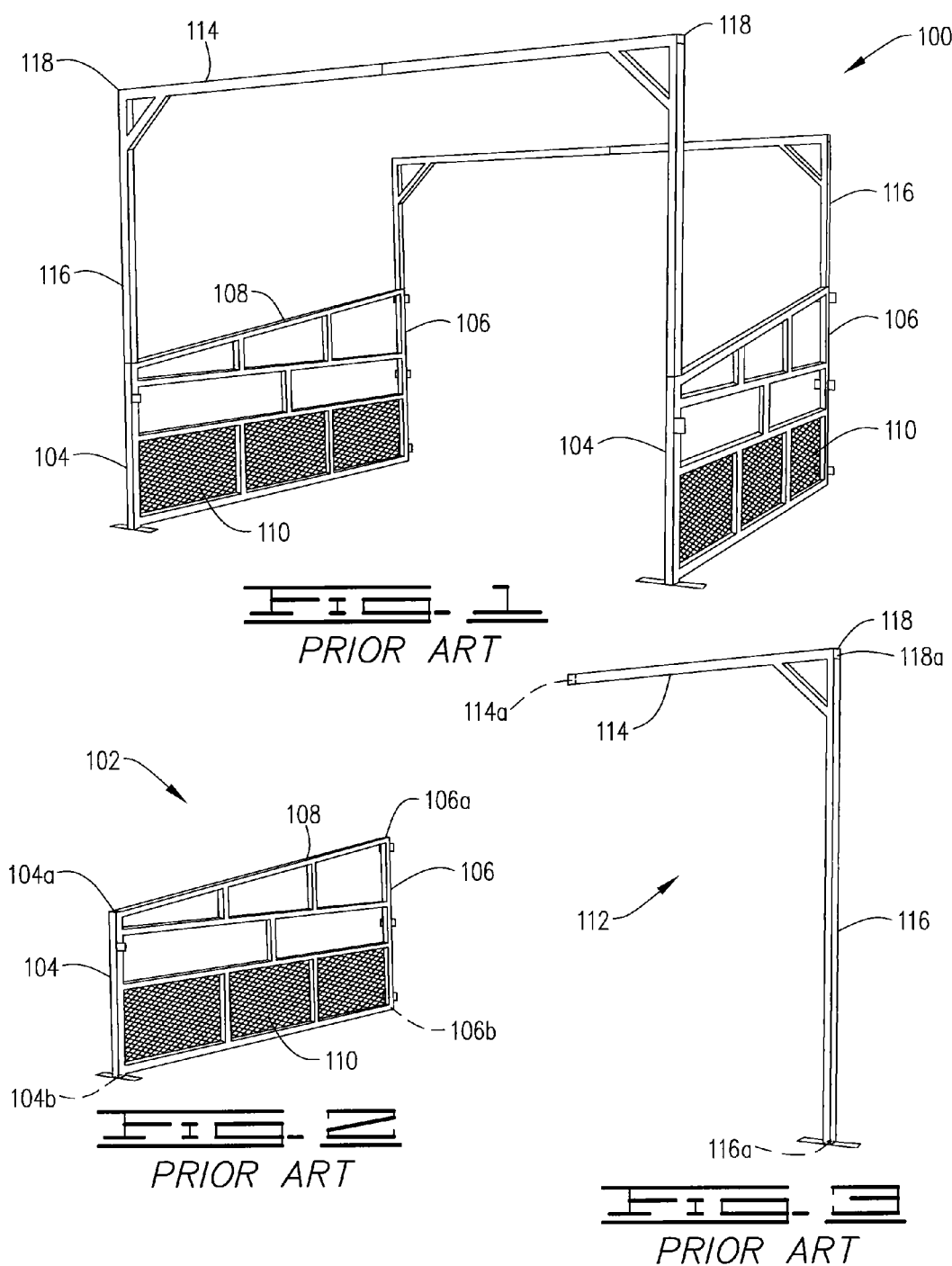

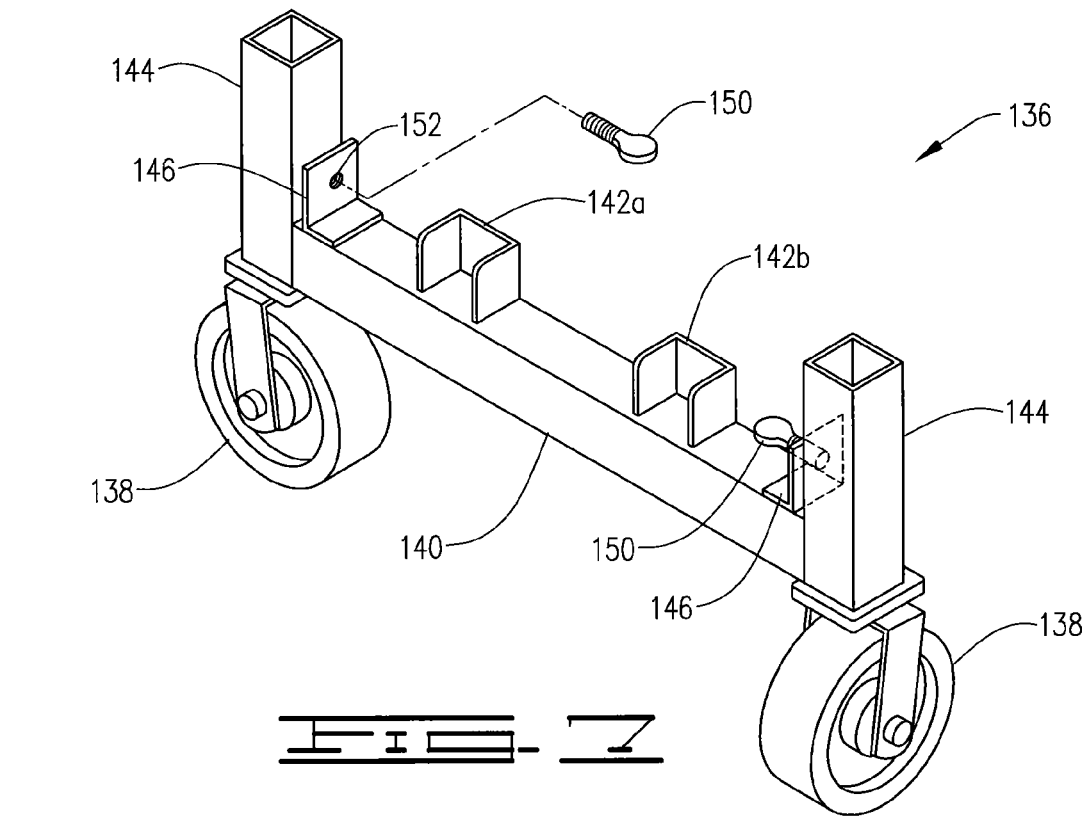
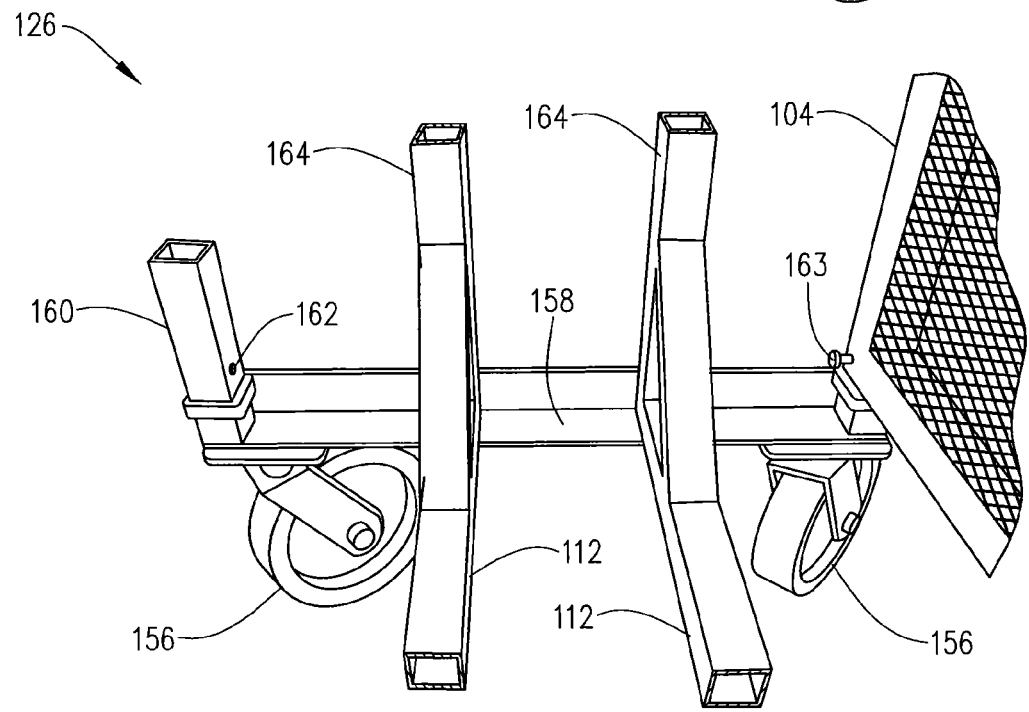

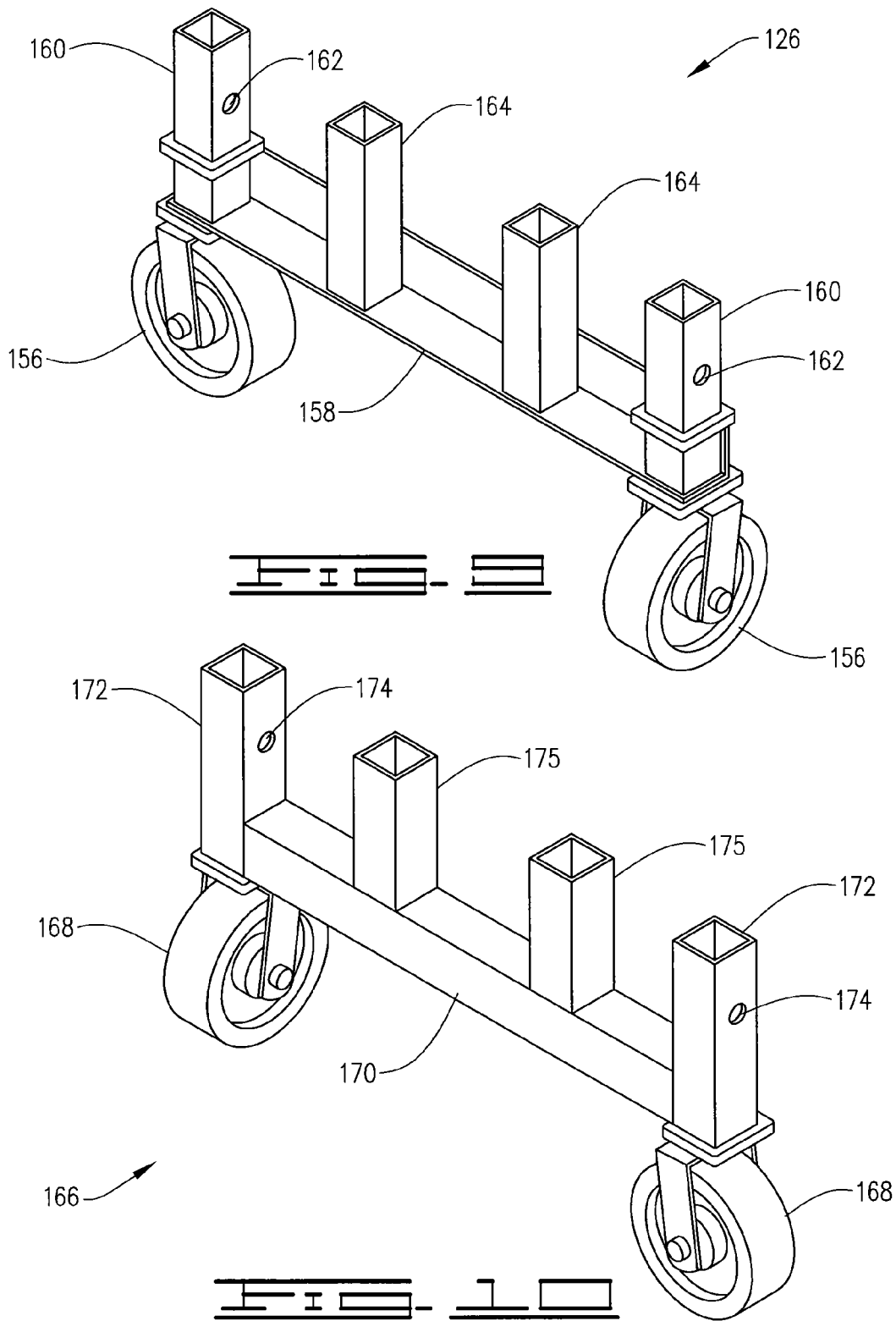

US 8,839,743 B2

APPARATUS AND METHOD FOR FORMING A CART

INCORPORATION BY REFERENCE

The entirety of U.S. patent application Ser. No. 12/942,755, filed Nov. 9, 2010, and Provisional Patent Application Ser. No. 61/259,319, filed Nov. 9, 2009, are each hereby expressly incorporated herein by reference.

BACKGROUND OF THE INVENTION

1. Field of the Invention

The inventive concept(s) disclosed herein relates generally to an apparatus and method for forming a cart, and more particularly, but not by way of limitation, to an apparatus and method for forming a cart by combining and utilizing dollies and livestock fan cage assemblies, extensions, chutes, and the like.

2. Brief Description of Related Art

In the livestock industry, and in particularly, in the competitive field of livestock breeding and showing, a wide variety of equipment is necessary for proper maintenance and showing of the animals. Breeders and owners show their livestock at various competitions and functions, and usually transport into each location the equipment for showing and maintenance of the animals. Numerous items are used for the livestock competitions and functions, and the equipment is often large and bulky.

During a competition, the needed equipment needs to be unloaded at the event location. This typically requires the breeder to back a trailer or truck up to the location doors and manually unload and transport the equipment into the location. The equipment must be transferred to a specific site for display and maintenance of the livestock during the event. This manual process requires a person to carry the equipment to the event site for the showing and maintenance of the animals during the event. Due to the quantity and size of the equipment, this unloading process usually takes several trips. While unloading, several other breeders and owners are typically waiting their turn to unload their equipment. This manual equipment transfer process presents problems of flow into and out of the event area and causes undesirable delay for the numerous breeders and owners waiting to unload their equipment.

Thus, there is a need for a device to minimize the time and effort required to unload and transport the necessary equipment at livestock shows. Additionally, it is desirable to provide a means to conveniently, quickly and easily transport all the necessary equipment from the truck or trailer and into the event location.

It is not believed that the prior art provides a satisfactory apparatus or means for transporting the necessary equipment for livestock showing and maintenance in various livestock competitions and functions. The equipment typically includes large fan cage assemblies, fans, chutes, feed, grooming supplies, and other various supplies. Although dollies are available to move many items, it is not believed that prior art dollies are available which provide the apparatus and means to simultaneously move the required equipment for livestock showing and maintenance.

BRIEF DESCRIPTION OF THE DRAWINGS

FIG. 1 is a perspective view of a prior art fan cage.

FIG. 2 is a perspective view of a prior art stall divider used in the fan cage of FIG. 1.

FIG. 3 is a perspective view of a prior art L bar used in the fan cage of FIG. 1.

FIG. 7 is a perspective view of another embodiment of a first dolly constructed in accordance with the present disclosure.

FIG. 8 is a perspective view of an embodiment of a second dolly shown connected to one stall divider and the corner of two L bars.

FIG. 9 is a perspective view of the embodiment of a second dolly shown in FIG. 7.

FIG. 10 is a perspective view of another embodiment of a first dolly constructed in accordance with the present disclosure.

DETAILED DESCRIPTION OF EXEMPLARY EMBODIMENTS

Figure 4:
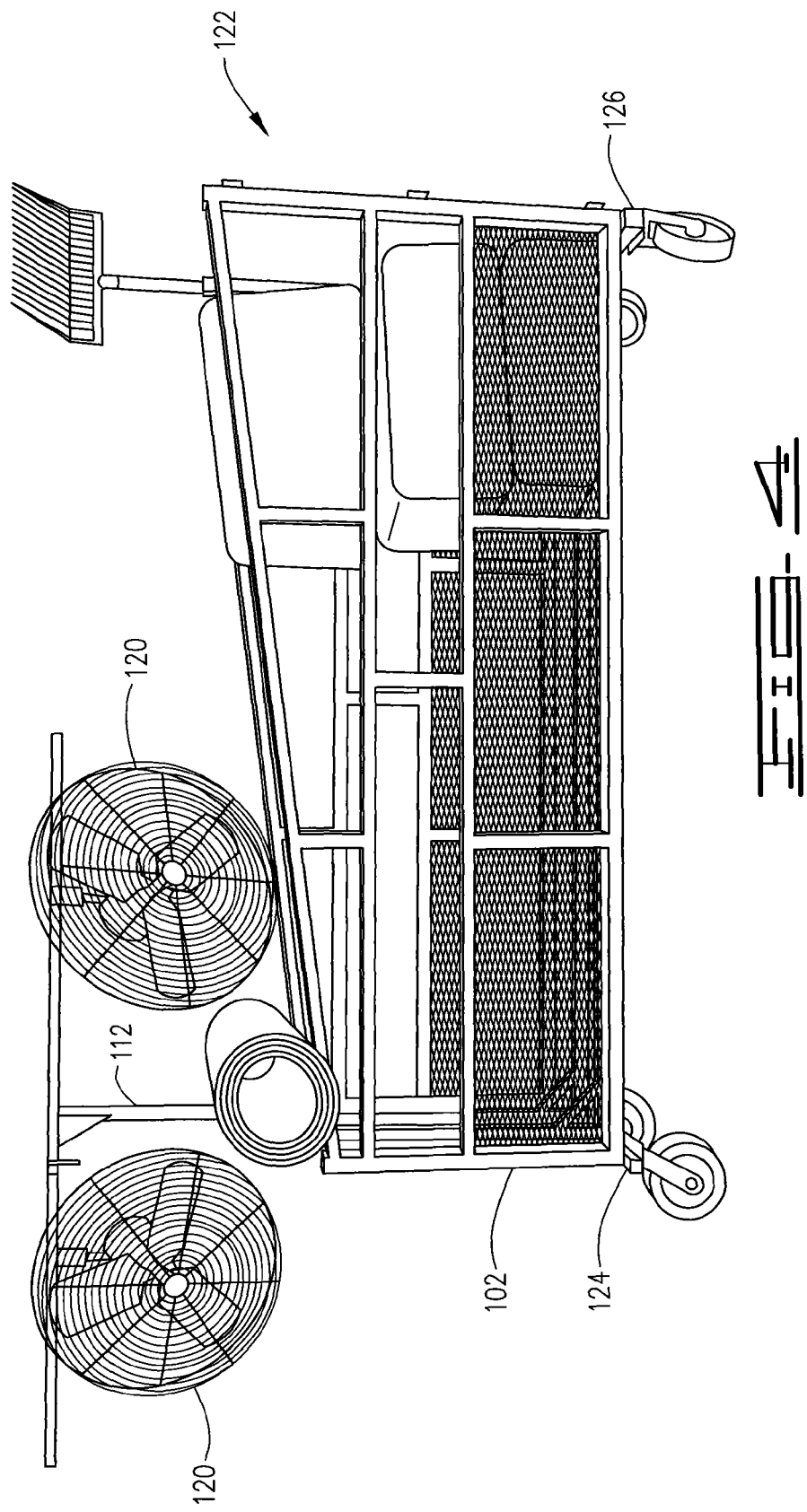
FIG. 4 is a perspective view of one embodiment of a cart constructed in accordance with the present disclosure and utilizing the fan cage of FIG. 1.

Referring now to the drawings and in particular to FIG. 1, shown therein is a fan cage 100 for displaying and maintaining livestock at competitions and other various functions. The fan cage 100 is typically brought to an event in a disassembled condition via a truck or trailer, transported by hand to a specified location for the showing and maintenance of the livestock, and then reassembled as illustrated in FIG. 1. The livestock can then be tethered to the fan cage 100 for showing and maintenance during the event.

Referring now to FIGS. 1-3, the fan cage 100 generally includes two stall dividers 102. Each stall divider 102 is substantially identical in construction; therefore, only one of the stall dividers 102 will be described in detail with reference to FIG. 2. A stall divider 102 can be used for separation of livestock at an event. The stall divider 102 typically includes two vertical support members 104 and 106. The vertical support members 104 and 106 may be fabricated with top openings 104a and 106a, respectively, as well as bottom openings 104b and 106b, respectively. The stall divider 102 can also include several horizontal members 108 and a mesh covering 110 located between portions of the horizontal members 108 and attached to the vertical support members 104 and 106. The fan cage 100 can function to separate the livestock and to contain bedding and other material at an event location. Although an exemplary embodiment of the inventive concept(s) disclosed herein may include the stall divider 102 as illustrated in FIG. 2, there are many configurations of stall dividers known in the industry, which may be used with the inventive concept(s) disclosed herein.

The fan cage 100 illustrated in FIG. 1 can also include two L bars 112, such as the L bars 112 illustrated in FIG. 3. Each L bar 112 preferably has a first straight member 114 and a second straight member 116 joined together to form a right angled corner 118. The first straight member 114, the second straight member 116, and the right angled corner 118 can include open ends 114a, 116a and 118a, respectively. Although an exemplary embodiment of the present disclosure may include an L bar 112 of FIG. 3, there are other L bars available in the industry which may also be used with the inventive concept(s) disclosed herein.

Referring again to FIG. 1, the fan cage 100 can be assembled by inserting the second straight members 116 of two L bars 112 into the top openings 104a of the stall dividers 102. Furthermore, a first straight member 114 of an L bar 112 can connect to a second straight member 114 of a second L bar 112 by inserting the end of the first straight member 114 into the open end 114a of the opposing second straight member 114 for example. Other ways to connect the first straight member 114 to the second straight member 114 may include telescoping members, or clamps, latch pins, and bolts, for example. The fan cage 100 may also be configured with additional L bars 112 inserted into the top openings 104a of the two stall dividers 102. Furthermore, the fan cage 100 may also include fans 120 (see FIG. 3). Although an exemplary embodiment of the inventive concept(s) disclosed herein may include the fan cage 100 of FIG. 1, there are many configurations of fan cages known in the industry, which may be used in the inventive concept(s) disclosed herein.

Referring now to FIG. 4, an exemplary embodiment of a cart 122 constructed in accordance with the inventive concept(s) disclosed herein is illustrated. The cart 122 provides breeders and owners with improved means for transporting the equipment for showing and maintaining livestock at an event. Thus, the inventive concept(s) disclosed herein preferably allows a breeder or owner to easily form the cart 122 from the equipment used at a livestock event, such as a disassembled fan cage 100 in FIG. 1.

After formation, the cart 122 can also be loaded with additional equipment and supplies, such as rakes, feed, fans, and the like. The cart 122 can then be wheeled into an event, reducing the time required to unload the equipment and eliminating manual carrying of heavy and bulky items. Furthermore, once the cart 122 reaches the designated location, the breeder or owner is then able to quickly unload materials from the cart 122, disassemble the cart 122, and reassemble the necessary equipment, such as the fan cage 100 illustrated in FIG. 1. Additionally, the inventive concept(s) disclosed herein provides another improvement over known devices, such as conventional dollies, to carry in the necessary equipment, because once the cart 122 is disassembled, preferably little remains for a breeder or owner to store.

As illustrated in FIG. 4, the cart 122 can include the two stall dividers 102, at least one L bar 112, a first dolly 124, and a second dolly 126. The two stall dividers 102 can form the sides of the cart 122, and the L bar 112 can be positioned between the first dolly 124, and the second dolly 126 to form a bottom of the cart 122. An exemplary embodiment includes two L bars 112 forming a bottom of the cart 122; however, the cart 122 could be formed to accommodate any number of L bars 112. Also, the cart 122 can be formed without using any L bars 112. Furthermore, additional types of stall dividers exist in the prior art and could be used to form the sides of the cart 122.

Figure 5:
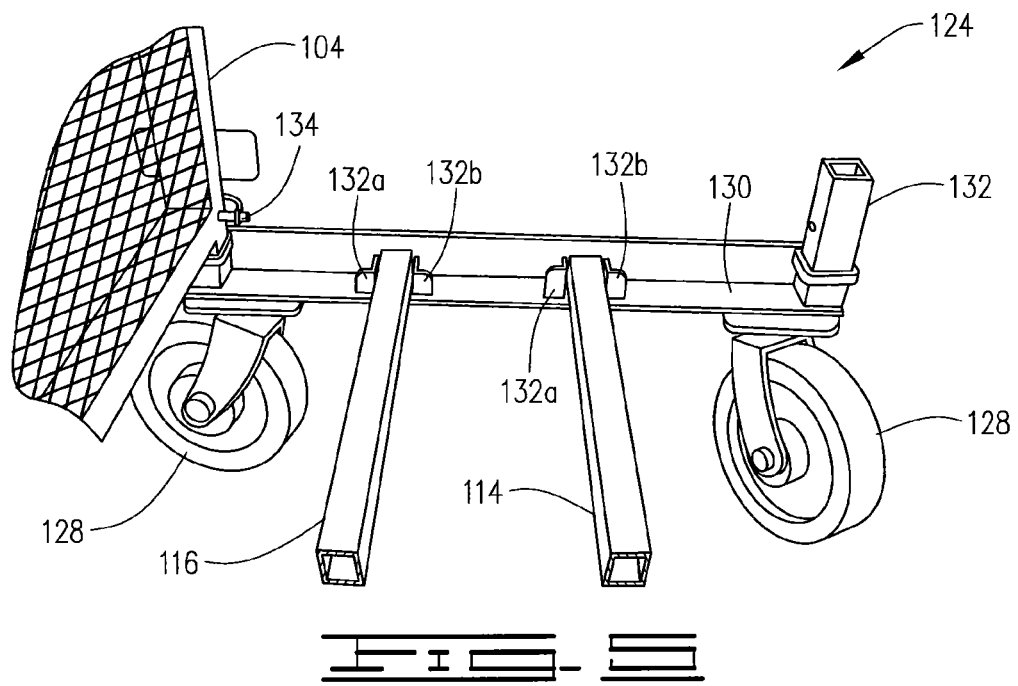
FIG. 5 is a perspective view of an embodiment of a first dolly shown connected to one stall divider and the straight ends of two L bars.
Figure 6:
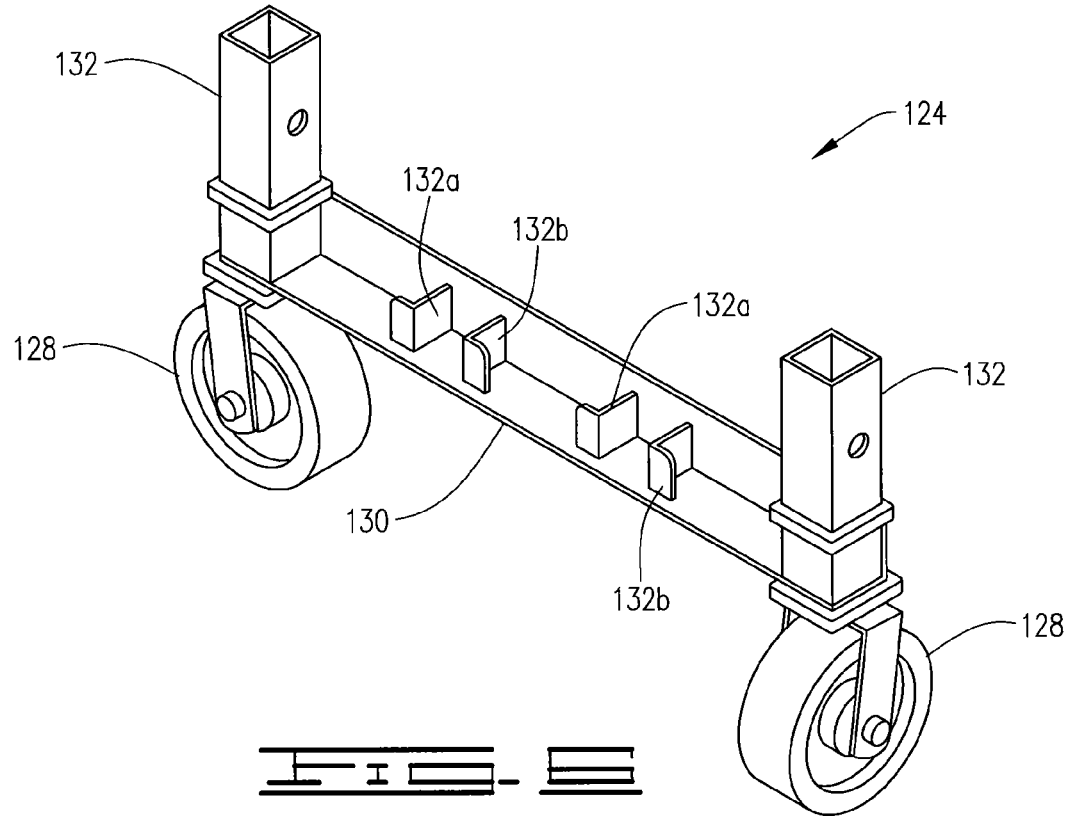
FIG. 6 is a perspective view of the embodiment of a first dolly shown in FIG. 5.

Referring to FIGS. 5-6, the first dolly 124 is illustrated including swivel wheels 128 attached to a first horizontal bar 130. Although FIGS. 5-6 illustrate the use of swivel wheels, other types of wheels, such as fixed wheels, may be used with the inventive concept(s) disclosed herein. The first horizontal bar 130 includes a pair of tabs 132a and 132b, each of which can cooperate to function as guides or stops for holding the first straight member 114 or the second straight members 116 of the L bars 112. Other means of fastening, such as clamps, bolts, and the like, may be used for attaching the first straight member 114 or the second straight member 116 of the L bars 112 to the first horizontal bar 130.

The first dolly 124 further includes a pair of outer support members 132 attached to the first horizontal bar 130 preferably near each of the outer ends thereof, such that the outer support members 132 extend in a substantially vertical orientation. The outer support members 132 can be configured to be received in the bottom opening 104b or 106b of the vertical support members 104 or 106 of the stall divider 102, as illustrated in FIG. 5. The outer support members 132 and the vertical support members 104 and 104 may have corresponding apertures formed therethrough to allow a latch pin 134 to be inserted through the apertures in order to secure the vertical support members 104 and 106 to the outer support members 132. The latch pin 134 may be secured to the first dolly 124 via a cable, or by any other suitable means known in the art. Other means of attaching the vertical support members 104 and 106 of the stall divider 102 to the first horizontal bar 130 may be used, including clamps, bolts, and the like, for example.

Referring now to FIG. 7, another embodiment of a first dolly 136 constructed in accordance with the present disclosure is illustrated. The first dolly 136 can include swivel wheels 138 attached to a first horizontal bar 140. Although FIG. 7 illustrates the use of swivel wheels, other types of wheels, such as fixed wheels, can be used with the inventive concept(s) disclosed herein. The first horizontal bar 140 is preferably substantially square shaped and includes a pair of inner retaining members 142a and 142b, each of which may function as a guide or stop for holding the first straight member 114 or the second straight members 116 of the L bars 112. The inner retaining members 142a and 142b each have three vertically extending walls which are substantially perpendicular to each other, and cooperate to define a U-shaped space for retaining the first straight member 114 or the second straight member 116 of the L bars 112. It will be appreciated that the inner retaining members 142a and 142b may also be oriented such that the U-shape is vertically inverted.

The first dolly 136 further includes a pair of outer support members 144 attached to the first horizontal bar 140 near each of the outer ends thereof such that the outer support members 144 extend in a substantially vertical orientation. The outer support members 144 are configured to be received in the bottom opening 104a or 106a of the vertical support members 104 or 106 of the stall divider 102 in a manner similar to that of FIG. 5. The first dolly 136 further comprises a pair of retaining members 146. The retaining members 146 can be disposed in a substantially parallel orientation to the outer support members 144, and may each have an aperture 152 adapted to receive a retaining bolt or set screws 150 therethrough. The retaining bolt 150 is preferably disposed in a substantially perpendicular orientation relative to the retaining vertical members 146 and the outer support members 144. When the outer support members 144 are received in the vertical support members 104 and 106 of the stall divider 102, the vertical support members 104 and 106 are preferably disposed between the outer support members 144 and the retaining vertical members 148. The retaining bolt 150 can operate to secure the vertical support member 104 or 106 of the stall divider 102 to the first horizontal bar 140 by compressing the vertical support member 104 or 106 of the stall divider 102 against the outer support member 144. Other means for securing the vertical support member 104 or 106 to the retaining vertical members 148 may include clamps, bolts, and latch pins, for example.

Referring to FIGS. 8-9, the second dolly 126 is illustrated to include two swivel wheels 156 attached to a second horizontal bar 158. Like the first dolly 124, the second dolly 126 preferably has two outer support members 160 extending vertically from the second horizontal bar 158 near the ends thereof. The outer support members 160 can be configured to be received in the bottom opening 104b or 106b of the vertical support members 104 or 106 of the stall divider 102. The outer support members 160 preferably have apertures 162 (see FIG. 9) formed therein, adapted to correspond to apertures in the vertical support members 104 and 106 to secure the vertical support members 104 and 106 to the second dolly 126 with a latch pin 163 (see FIG. 8). Other means of attaching the stall divider 102 to the second horizontal bar 158 may be used, including clamps, and bolts, for example.

The second dolly 126 can further have a pair of inner support members 164 attached to and extending substantially vertically from the second horizontal bar 158 between the outer support members 160. The inner support members 164 can be configured to be received by the corner opening 114a of the first straight member 114 of the L bar 112.

Referring now to FIG. 10, another embodiment of a second dolly 166 of the present disclosure is illustrated. The second dolly 166 is shown to include two swivel wheels 168 attached to a second horizontal bar 170 having a substantially square shape. The second dolly 166 preferably has two outer support members 172 extending vertically from the second horizontal bar 170 near the ends thereof. The outer support members 172 can be configured to be received in the bottom opening 104b or 106b of the vertical support members 104 or 106 of the stall divider 102. The outer support members 172 preferably have apertures 174 formed therein, adapted to correspond to apertures in the vertical support members 104 and 106 to secure the vertical support members 104 and 106 to the second horizontal bar 170 with a bolt or set screw (not shown).

The second dolly 166 further has a pair of inner support members 175 attached to and extending substantially vertically from the second horizontal bar 170 between the outer support members 172. The inner support members 175 can be configured to be received by the corner opening 114a of the first straight member 114 of the L bar 112. Other means of attaching the stall divider 102 to the second horizontal bar 170 may be used, including clamps, and bolts, for example.

Figure 11:
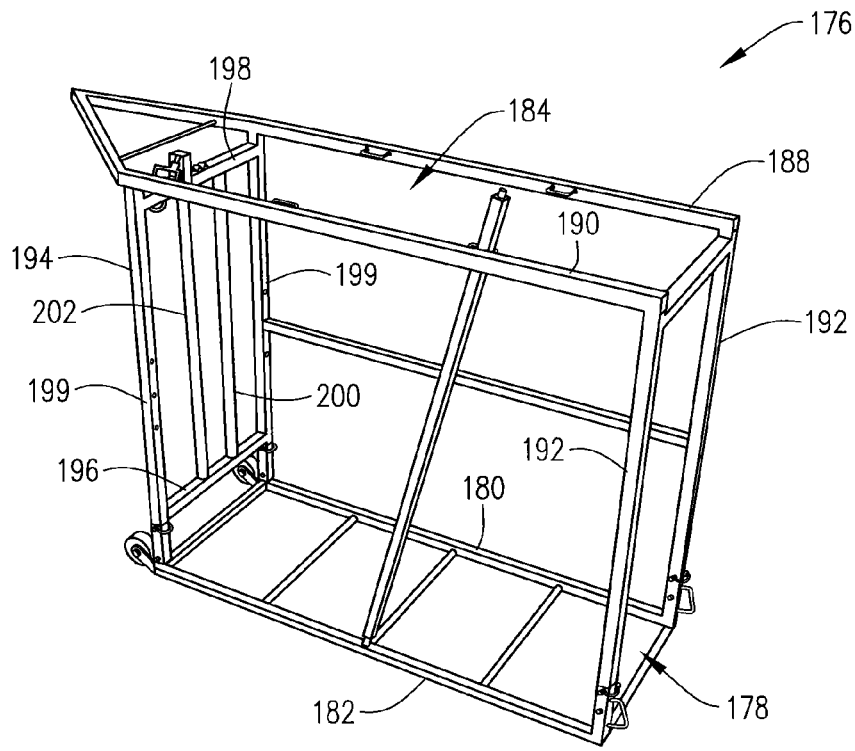
FIG. 11 is a perspective view of a prior art livestock chute.

Referring now to FIG. 11, a livestock chute 176 is illustrated. Chutes, such as the chute 176 illustrated in FIG. 11, can be used by breeders and owners to display and hold their livestock at competitions and other various functions. Chutes, similar to fan cages, are bulky equipment and typically are be hand carried into the event.

The chute 176 preferably includes a bottom section 178 having two bottom horizontal bars 180 and 182 connected in a parallel configuration. The chute 176 also preferably includes a top section 184 having two top horizontal bars 188 and 190 connected in a similar parallel configuration. Additionally, the bottom horizontal bars 180 and 182 can be parallel to the top horizontal bars 188 and 190. The chute 176 may have a pair of rear vertical support members 192 and a head gate 194 attached at opposite ends of the bottom horizontal bars 180, 182, to support the top section 184 in an elevated relationship to the bottom section 178. The head gate 194 preferably has a bottom bar 196, a top bar 198, two vertical bars 199, a vertical bar 200, and an adjustable bar 202 to allow for the insertion of an animal's head through the vertical bars 199, 200, and adjustable bar 202 of the head gate 194. The chute 176 may incorporate other horizontal and vertical bars for added support and rigidity. Although an exemplary embodiment of the present disclosure includes the chute 176 as illustrated in FIG. 11, there are many configurations of chutes known in the industry, which may be used in the inventive concept(s) disclosed herein.

Figure 12:
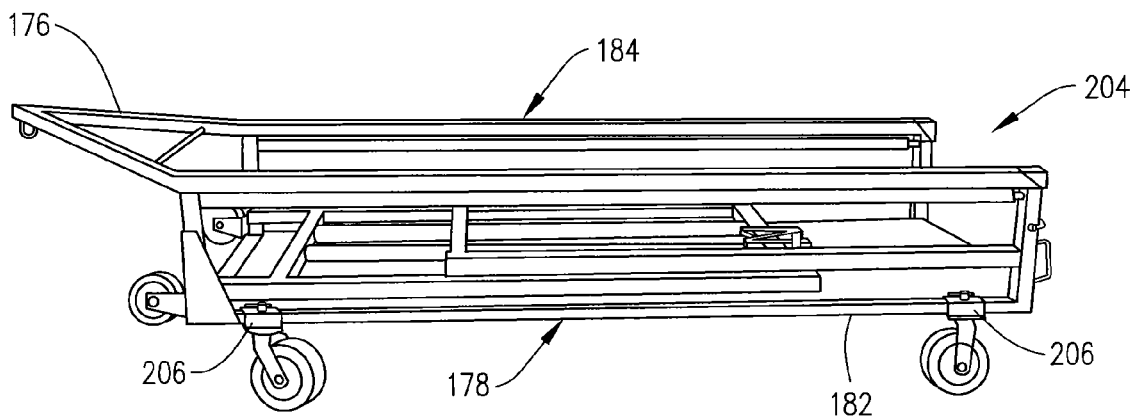
FIG. 12 is a perspective view of another embodiment of a cart constructed in accordance with the present disclosure and utilizing the chute of FIG. 10.

Referring now to FIG. 12, another embodiment of a cart 204 constructed in accordance with the present disclosure is illustrated. The cart 204 is similar to the previous cart 122, in that it may allow easier transportation of chutes and other equipment into an event. The cart 204 is easily assembled, loaded with necessary equipment, and transported into an event. The cart 204 is then unloaded, disassembled and can be stored.

Figures 13, 14:
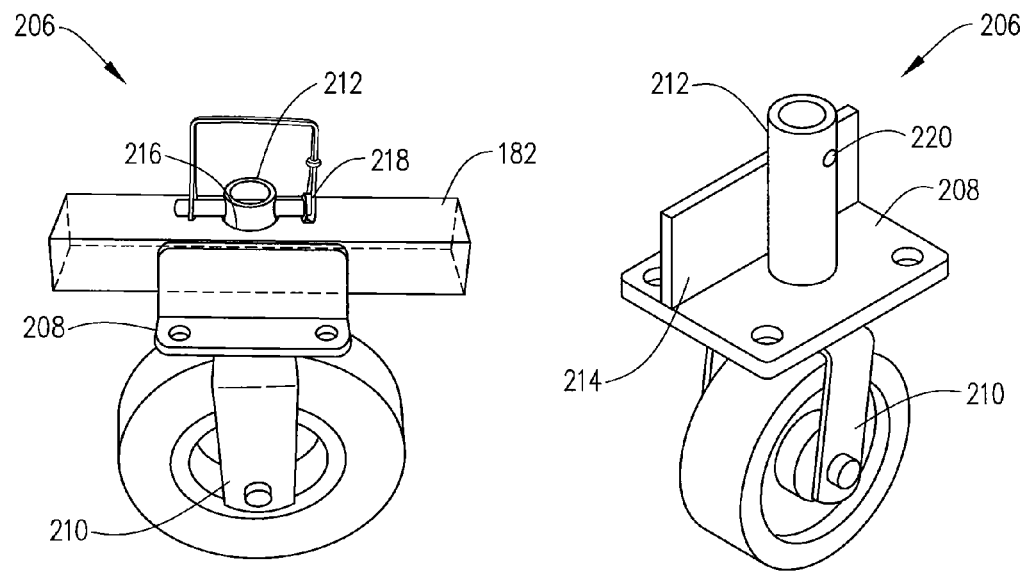
FIG. 13 is a perspective view of a castor assembly shown attached to the cart of FIG. 12.
FIG. 14 is a perspective view of the castor assembly of FIG. 13.

As illustrated in FIG. 12, the cart 204 preferably includes the chute 176 of FIG. 11. The chute 176 can be configured with the top section 184 directly attached to the bottom section 178 and the pair of rear vertical support members 192 and head gate 194 in a prone position between the bottom horizontal bars 180 and 182 of the bottom section 178. Additionally, the cart 204 includes a plurality of castor assemblies 206, as illustrated in FIGS. 13 and 14. The castor assemblies 206 are preferably attached to the bottom horizontal bars 180 and 182 of the chute 176. The cart 204 is illustrated as having four castor assemblies 206, but it will be appreciated that any number of castor assemblies may be used.

Referring now to FIGS. 13-14, the castor assembly 206 includes a base plate 208, a wheel assembly 210, a stem 212, and a vertical support plate 214. The wheel assembly 210 is connected to the base plate 208 in any suitable manner and may be fixed or rotatable relative to the base plate 208. The stem 212 extends upwardly from the base plate 208 and can be configured to be received in an opening 216 preferably provided through the bottom horizontal bars 180 and 182 of the chute 176. With the stem 212 inserted through the opening 216, the castor assembly 206 can be secured to the chute 176 with a latch pin 218 or other suitable fastener for example. The latch pin 218 can be inserted through openings 220 provided near the upper end of the stem 212. The vertical support plate 214 is preferably spaced from the stem 212 such that the vertical support plate 214 engages one side of the bottom horizontal bar 180 or 182 to provide support to the castor assembly 206.

Figures 15, 16:
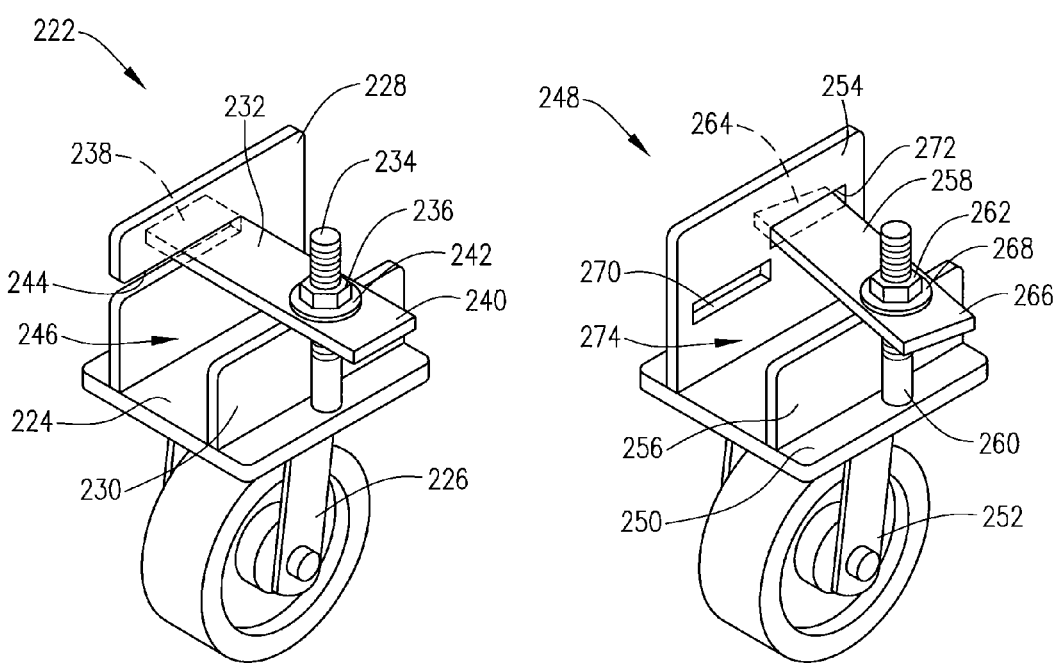
FIG. 15 is a perspective view of another embodiment of a castor assembly according to the present disclosure.
FIG. 16 is a perspective view of another embodiment of a castor assembly according to the present disclosure.

Referring now to FIG. 15, another embodiment of a castor assembly 222 includes a base plate 224, a wheel assembly 226, a vertical support plate 228, a vertical retaining member 230, a horizontal retaining member 232, a retaining bolt 234, and a retaining nut 236. The wheel assembly 226 may be connected to the base plate 224 in any suitable manner and may be fixed or rotatable relative to the base plate 224. The vertical support plate 228, the vertical retaining member 230, and the retaining bolt 234 extend upwardly from the base plate 224 and can be in a spaced apart and substantially parallel orientation, such that the vertical retaining member 230 is disposed between the vertical support plate 228 and the retaining bolt 234.

The horizontal retaining member 232 has a flat first end 238 and a flat second end 240 having an aperture (not shown) adapted to receive the retaining bolt 234 therethrough. The vertical support plate 228 has a slot 244 intersecting one side thereof and adapted to receive and engage the first end 238 of the horizontal retaining member 232. When the first end 238 of the horizontal retaining member 232 is disposed in the slot 244, the retaining bolt 234 is inserted into the aperture (not shown), and the retaining nut 236 is tightened. The vertical support plate 228, the vertical retaining member 230, and the horizontal retaining member 232 cooperate to define a substantially rectangular space 246 adapted to receive and retain the bottom horizontal bars 180 and 182 of the chute 176. An optional washer 242 may be inserted onto the retaining bolt 234 prior to inserting the retaining nut 236.

Referring now to FIG. 16, shown therein is another embodiment of a castor assembly 248. The castor assembly 248 includes a base plate 250, a wheel assembly 252, a vertical support plate 254, a vertical retaining member 256, a horizontal retaining member 258, a retaining bolt 260, and a retaining nut 262. The wheel assembly 252 is connected to the base plate 250 in any suitable manner and may be fixed or rotatable relative to the base plate 250. The vertical support plate 254, the vertical retaining member 256, and the retaining bolt 260 extend upwardly from the base plate 250 and are in a spaced apart and substantially parallel orientation relative to each other, such that the vertical retaining member 256 is disposed between the vertical support plate 254 and the retaining bolt 260. The horizontal retaining member 258 has a flat first end 264, and a second end 266 having an aperture (not shown) adapted to receive the retaining bolt 260 therethrough. The vertical support plate 254 has a first slot 270 and a laterally and horizontally offset second slot 272 formed therein and adapted to receive the first end 264 of the horizontal retaining member 258.

When the first end 264 of the horizontal retaining member 258 is inserted into the first slot 270 or the second slot 272, the retaining bolt 260 is inserted through the aperture (not shown), and the retaining nut 262 is tightened, the vertical support plate 254, the vertical retaining member 256, and the horizontal retaining member 258 cooperate to define a substantially rectangular space 274 adapted to receive and retain the bottom horizontal bars 180 and/or 182 of the cart 204. The first slot 270 and the second slot 272 of the vertical support plate 254 allow for the alternative insertion and retention of a bottom horizontal bar 180 and/or 182 with a first size, and a second size, respectively. An optional washer 268 may be disposed between the horizontal retaining member 258 and the retaining nut 262.

From the above description, it is clear that the inventive concept(s) disclosed herein is well adapted to carry out the objects and to attain the advantages mentioned herein as well as those inherent in the inventive concept(s) disclosed herein. While presently preferred embodiments of the inventive concept(s) disclosed herein have been described for purposes of this disclosure, it will be understood that numerous changes may be made which will readily suggest themselves to those skilled in the art and which are accomplished within the spirit of the inventive concept(s) disclosed herein and defined by the appended claims.

What is claimed is:

1. A cart for transporting equipment for showing livestock, comprising:
   a first stall divider having at least two vertical members and a plurality of horizontal members interconnecting the vertical members with one another, the vertical members having an opening in each end thereof; and
   a second stall divider having at least two vertical members and a plurality of horizontal members connecting the vertical members with one another, the vertical members of the second stall divider having an opening in each end thereof;
   wherein the first and second stall dividers are positionable in a spaced apart, parallel relationship to define at least a portion of a livestock holding pen;
   a first dolly including a horizontal member, a pair of wheels extending from a bottom side of the horizontal member, and a pair of outer support members extending upwardly from the horizontal member;
   a second dolly including a horizontal member, a pair of wheels extending from a bottom side of the horizontal member, and a pair of outer support members extending upwardly from the horizontal members,
   wherein one of the outer support members of the first dolly is slidingly received in the opening of one of the vertical members of the first stall divider and the other outer support member of the first dolly is slidingly received in the opening of one of the vertical members of the second stall divider; and wherein one of the outer support members of the second dolly is slidingly received in the opening of the other vertical member of the first stall divider and the other outer support member of the second dolly is slidingly received in the opening of the other vertical member of the second stall divider, such that the first and second stall dividers are rollingly supported by the first and second dollies in a substantially parallel, spaced apart relationship to define an equipment storage space therebetween;
   a first L-shaped member having a first leg and a second leg, a distal end of the first leg being receivable in the opening of the upper end of the vertical member of the first stall divider; and
   a second L-shaped member having a first leg and a second leg, a distal end of the second leg being receivable in the opening of the upper end of one of the vertical members of the second stall divider and a distal end of the second leg of the second L-shaped member being connectable to a distal end of the second leg of the first L-shaped bar,
   wherein one of the first and second legs of the first L-shaped member extends from the first dolly to the second dolly and wherein one of the first and second legs of the second L-shaped member extends from the first dolly to the second dolly.

2. The cart of claim 1 wherein one of the first and second legs of the first L-shaped member extends upwardly from one of the first and second dollies and wherein one of the first and second legs of the second L-shaped member extends upwardly from one of the first and second dollies.

3. The cart of claim 1 wherein the first dolly further comprises:
   a first retaining member connected to the upper side of the horizontal member, one of the first and second leg members of the first L-shaped member being received in the first retaining member; and
   a second retaining member connected to the upper side of the horizontal member, one of the first and second leg members of the second L-shaped member being received in the second retaining member.

4. The cart of claim 1 wherein each of the first and second L-shaped members has an opening at a proximal end of one of the first and second legs, and wherein the second dolly further comprises a pair of inner support members extending upwardly from the horizontal member and positioned between the outer support members, one of the inner support members of the second dolly being slidingly received in the opening at the proximal end of one of the first and second leg members of the first L-shaped member and the other inner support member of the second dolly being slidingly received in the opening at the proximal end of one of the first and second leg members of the second L-shaped member.

5. A kit for forming a cart for transporting equipment for showing livestock, the equipment comprising:

a first stall divider having at least two vertical members and a plurality of horizontal members interconnecting the vertical members with one another, the vertical members having an opening in at least one each end thereof; and a second stall divider having at least two vertical members and a plurality of horizontal members connecting the vertical members with one another, the vertical members of the second stall divider having an opening in each end thereof, wherein the first and second stall dividers are positionable in a spaced apart, parallel relationship to define at least a portion of a livestock holding pen, the kit comprising:

a first dolly including a horizontal member, a pair of wheels extending from a bottom side of the horizontal member, and a pair of outer support members extending upwardly from the horizontal member;

a second dolly including a horizontal member, a pair of wheels extending from a bottom side of the horizontal member, and a pair of outer support members extending upwardly from the horizontal members, wherein one of the outer support members of the first dolly is slidingly receivable in the opening of one of the vertical members of the first stall divider and the other outer support member of the first dolly is slidingly receivable in the opening of one of the vertical members of the second stall divider; and wherein one of the outer support members of the second dolly is slidingly receivable in the opening of the other vertical member of the first stall divider and the other outer support member of the second dolly is slidingly receivable in the opening of the other vertical member of the second stall divider, such that the first and second stall dividers are rollingly supportable by the first and second dollies in a substantially parallel, spaced apart relationship to define an equipment storage space therebetween;

a first L-shaped member having a first leg and a second leg, a distal end of the first leg being receivable in the opening of the upper end of the vertical member of the first stall divider; and a second L-shaped member having a first leg and a second leg, a distal end of the second leg being receivable in the opening of the upper end of one of the vertical members of the second stall divider and a distal end of the second leg of the second L-shaped member being connectable to a distal end of the second leg of the first L-shaped bar, wherein one of the first and second legs of the first L-shaped member are extendable from the first dolly to the second dolly and wherein one of the first and second legs of the second L-shaped member are extendable from the first dolly to the second dolly.

6. The kit of claim 5 wherein one of the first and second legs of the first L-shaped member is extendable extend upwardly from one of the first and second dollies and wherein one of the first and second legs of the second L-shaped member is extendable upwardly from one of the first and second dollies.

7. The kit of claim 5 wherein the first dolly further comprises:

a first retaining member connectable to the upper side of the horizontal member, one of the first and second leg members of the first L-shaped member being receivable in the first retaining member; and a second retaining member connectable to the upper side of the horizontal member, one of the first and second leg members of the second L-shaped member being receivable in the second retaining member.

8. The kit of claim 5 wherein each of the first and second L-shaped members has an opening at a proximal end of one of the first and second legs, and wherein the second dolly further comprises a pair of inner support members extending upwardly from the horizontal member and positioned between the outer support members, one of the inner support members of the second dolly being slidingly receivable in the opening at the proximal end of one of the first and second leg members of the first L-shaped member and the other inner support member of the second dolly being slidingly receivable in the opening at the proximal end of one of the first and second leg members.

* * * * *

UNITED STATES PATENT AND TRADEMARK OFFICE
CERTIFICATE OF CORRECTION

PATENT NO.         : 8,839,743 B2                              Page 1 of 1
APPLICATION NO.    : 13/939415
DATED              : September 23, 2014
INVENTOR(S)        : Randal L. Chandler It is certified that error appears in the above-identified patent and that said Letters Patent is hereby corrected as shown below:

In the Claims:
Column 9, line 4: After "having an opening in" delete "at least one".

Signed and Sealed this
Ninth Day of December, 2014

Michelle K. Lee
*Deputy Director of the United States Patent and Trademark Office*